United States Patent [19]

Ewig, Jr.

[11] 4,208,792

[45] Jun. 24, 1980

[54] SHEARING TOOL

[75] Inventor: John F. Ewig, Jr., Worcester, Mass.

[73] Assignee: Parker Manufacturing Company, Worcester, Mass.

[21] Appl. No.: 949,753

[22] Filed: Oct. 10, 1978

[51] Int. Cl.² ............................................ B26B 15/00
[52] U.S. Cl. ...................................... 30/228; 30/241
[58] Field of Search ................. 30/241, 228, 180, 242, 30/243

[56] References Cited

U.S. PATENT DOCUMENTS

| | | | |
|---|---|---|---|
| 2,257,245 | 9/1941 | Rudolph | 30/228 |
| 2,329,387 | 9/1943 | Brenning | 30/242 X |
| 2,542,103 | 2/1951 | Adel | 30/241 |
| 2,714,250 | 8/1955 | Twedt | 30/180 |
| 3,058,214 | 10/1962 | Mekler | 30/180 |
| 3,837,077 | 9/1974 | Filter | 30/241 |

*Primary Examiner*—Jimmy C. Peters
*Attorney, Agent, or Firm*—Norman S. Blodgett; Gerry A. Blodgett

[57] ABSTRACT

A shearing tool comprising a fixed blade and a movable blade which is driven toward the fixed blade in a straight line within a shear plane.

6 Claims, 11 Drawing Figures

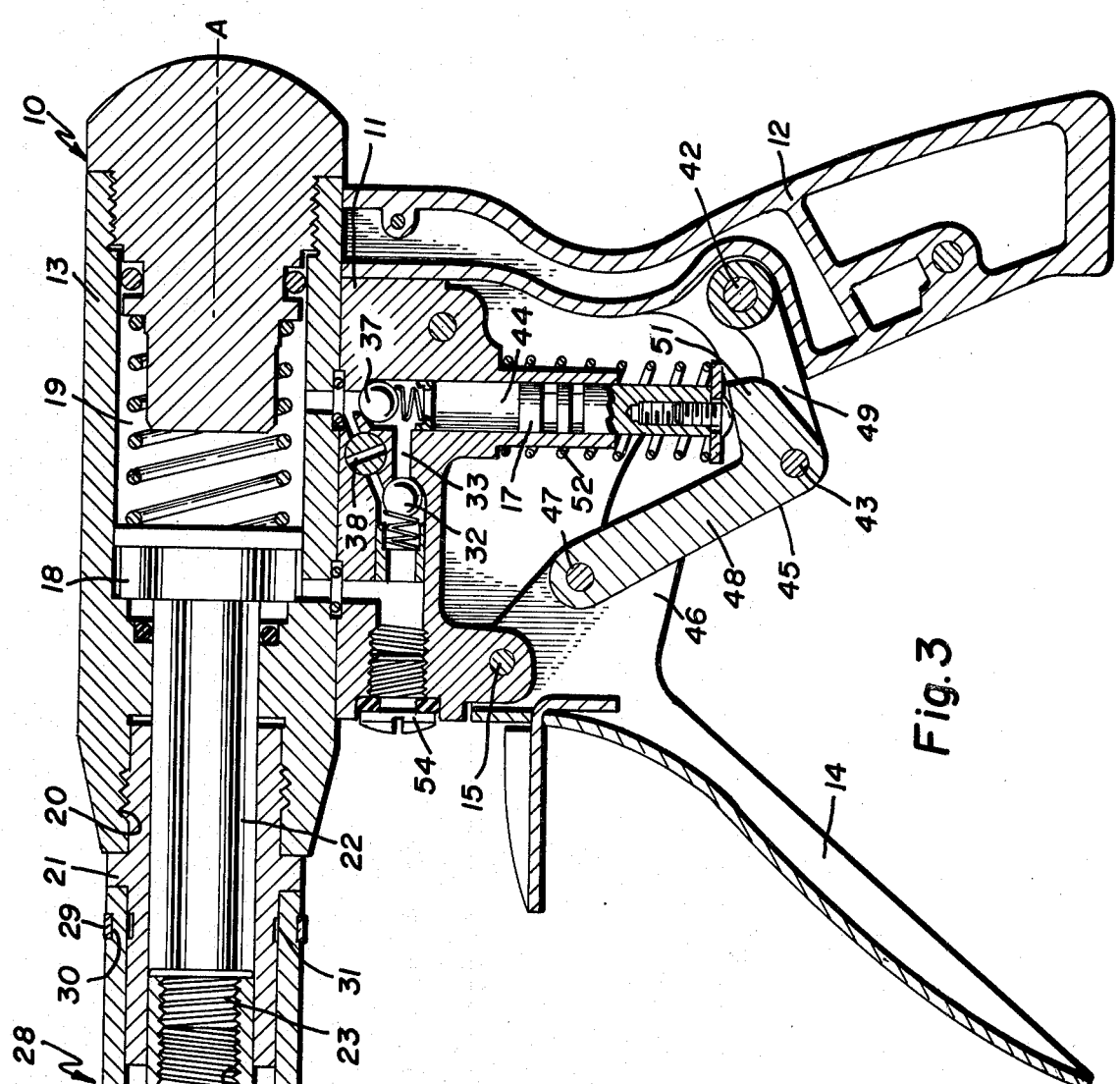
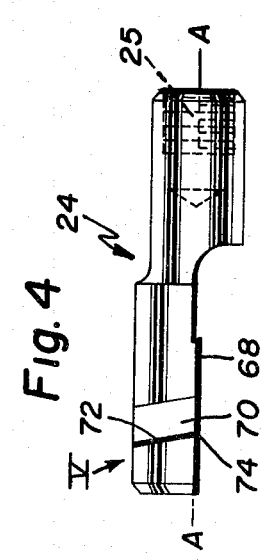
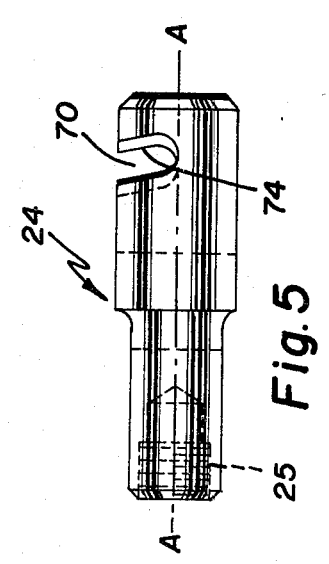

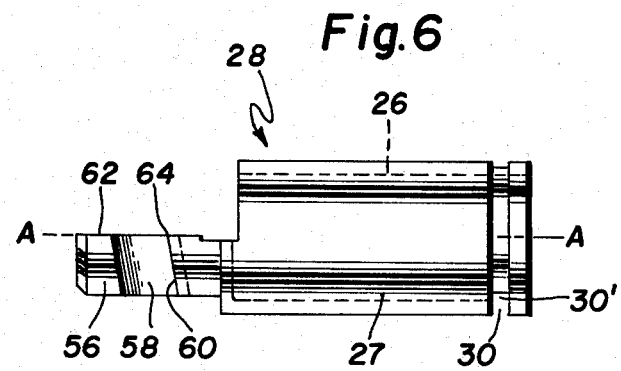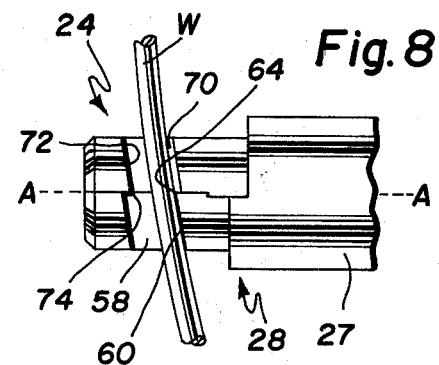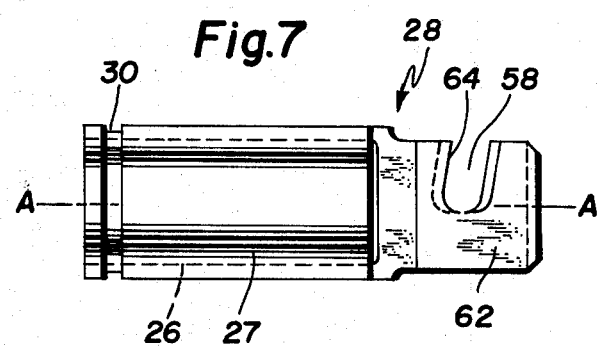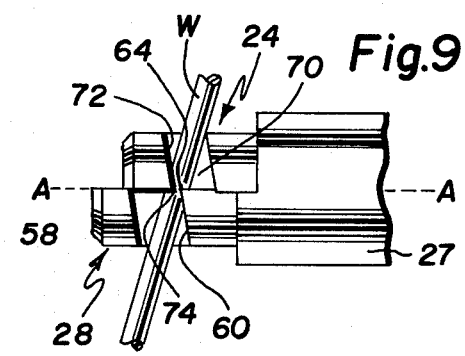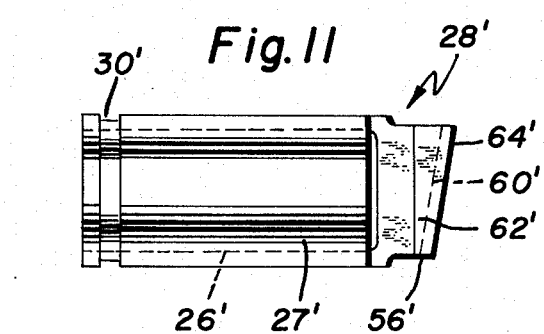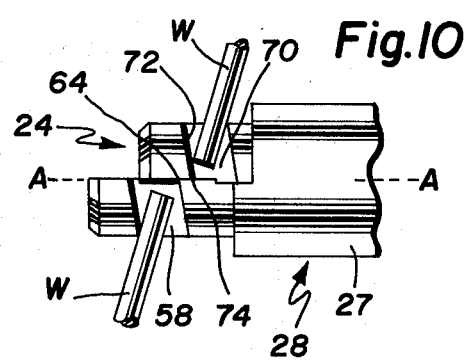

SHEARING TOOL

BACKGROUND OF THE INVENTION

Conventional shearing tools take many forms, but usually they employ two overlapping blades arranged in scissor-like fashion or two opposed blades arranged in pincer fashion. Another variation comprises a single blade opposed by an anvil. In all cases the blades, together with their integral handles, are pivoted together and operate as simple levers. The shearing forces that can be developed along the cutting edges of the blades are a function of the length ratio of the handle to the blade portion of each pivoting member. When dealing with objects which are difficult to cut, such as wire cable or other products of metallic or hard substance, conventional shearing tools are inadequate. In order to produce the required shearing forces, the handle-to-blade ratio is increased, which results in a limited cutting blade opening or an awkward handle size which is difficult to operate. Conventional wire cutters, for example, have large handle-to-blade ratios, but are limited to cutting very small wire. When conventional shears are overloaded, the blades tend to spring apart and become permanently deformed, so that they are rendered useless.

Power shearing tools have been developed which employ a cutting blade driven in a straight line by hydraulic means or the like toward a stationary anvil for cutting large or hard objects. However, one disadvantage in this approach is that all of the cutting is done from one side of the work to be cut, thereby severely limiting the effective cutting capacity of the tool for a given amount of power function. In general, power cutters are awkward and difficult to operate. These and other difficulties experienced with the prior art devices have been obviated by the present invention.

It is, therefore, an outstanding object of the invention to provide a shearing tool for hard-to-cut objects which utilizes a fixed cutting edge and a movable cutting edge which is driven towards the fixed cutting edge in a straight line within a shear plane, thereby cutting the object from both sides.

Another object of this invention is the provision of a shearing tool in which the fixed cutting edge is part of a tubular shear member and the movable cutting edge is part of a second shear member, slidably guided within the first tubular shear member to accurately position the cutting edges with respect to each other.

A further object of the present invention is the provision of a shearing tool in which the shear plane bisects the tubular portion of the second shear member, thereby eliminating a binding moment arm.

It is another object of the instant invention to provide a shearing tool in which the first and second shear members have opposed flat surfaces within the shear plane, the first and second cutting edges being formed in the respective first and second flat surfaces to enable the cutting edges to pass each other within the shear plane.

A still further object of the invention is the provision of a shearing tool in which at least the movable second cutting edge is formed by a slot in the second shear which cuts through the flat surface in the second shear member for receiving and holding the work to be cut.

It is a further object of the invention to provide a shearing tool in which the first and second cutting edges diverge within the shear plane toward the bottom of the slot in the second shear member to trap the workpiece in the slot as it is being cut.

It is a still further object of the invention to provide a shearing tool in which the two sides forming each cutting edge are at an acute angle to minimize twisting of the workpiece during shearing.

It is a futher object of the invention to provide a shearing tool in which the driving force for the second or movable cutting edge is hydraulic to provide the necessary power for cutting hard or difficult to cut objects.

It is a further object of the invention to provide a shearing tool in which the cutting elements are mounted in a hydraulically-actuated hand tool which is both simple to use and provides adequate power for cutting difficult to cut objects.

Another object of the invention is the provision of a two-part shearing arrangement in which one part is supported in the other to eliminate the tendancy of the parts to spring apart under the cutting load.

SUMMARY OF THE INVENTION

In general, the invention consists of a shearing tool in which a second movable shear member containing a second cutting edge is guided for movement along a straight line toward a first fixed shear member having a first cutting edge. Both cutting edges lie in the same shear plane and the second cutting edge is moved toward the first edge within the plane. Each cutting edge is formed by a flat surface within the shear plane in a generally transverse surface forming an acute angle with the flat surface. The shearing elements are preferably mounted in a hand-operated hydraulic gun operated by a squeeze lever for pumping hydraulic fluid to drive the second shear member. The second shear member has a tubular portion fixed to the gun. The first shear member is slidably mounted and supported within this tubular portion and is connected to a hydraulic piston within the housing of the gun.

BRIEF DESCRIPTION OF THE DRAWINGS

The character of the invention, however, may be best understood by reference to one of its structural forms, as illustrated by the accompanying drawings, in which:

FIG. 3 is a vertical sectional view of the shearing tool taken on the line III—III of FIG. 2.

FIG. 4 is a plan view of a first movable shear member,

FIG. 5 is a side elevational view of the first movable shear member looking in the direction of arrow V of FIG. 4, FIG. 6 is a plan view of the fixed shear member, FIG. 7 is a side elevational view of the fixed shear member looking in the direction of arrow VII of FIG. 6, FIGS. 8-10 are fragmentary operational views showing relative positions of the cutting elements as a workpiece is being sheared, and FIG. 11 is a side elevational view of a modified fixed shear member.

DESCRIPTION OF THE PREFERRED EMBODIMENT

Figure 1:
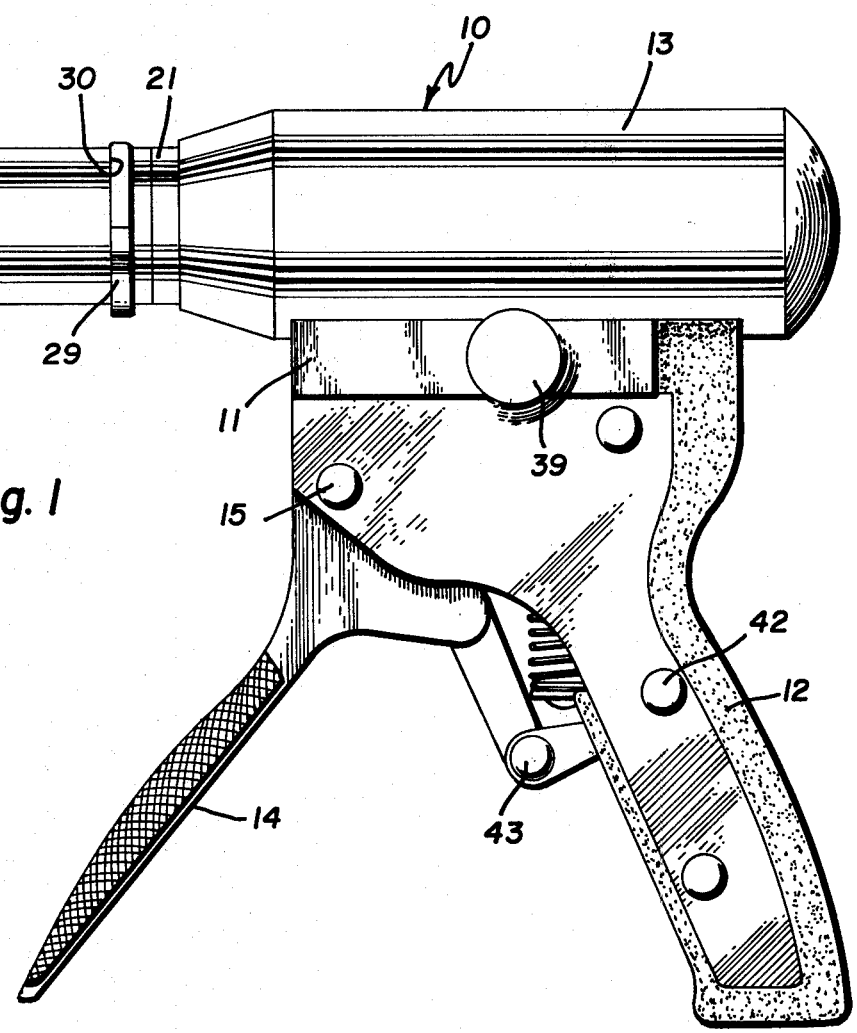
FIG. 1 is a front elevational view of a hand-operated shearing tool embodying the principles of the present invention.
Figure 2:
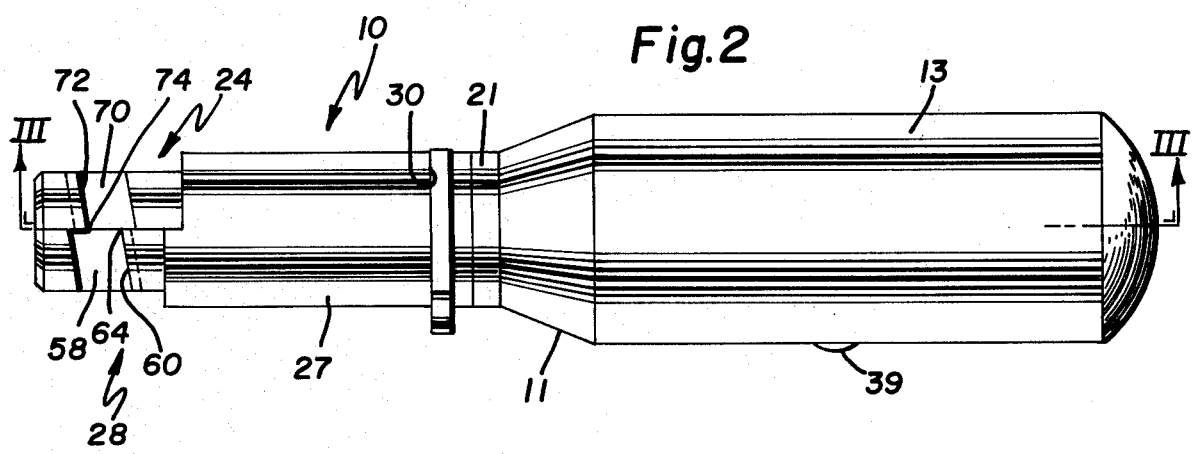
FIG. 2 is a plan view of the tool.

Referring first to FIGS. 1, 2, and 3, wherein are best shown the general features of the invention, the shearing tool, indicated generally by the reference numeral 10, is shown as applied to a hand-operated hydraulic gun having a main body housing 11. The gun is provided with a hand grip 12, an elongated barrel portion 13, and a squeeze lever 14 hinged by a pivot pin 15 to the main body.

Referring particularly to FIG. 3, it can be seen that a pump piston 17 is carried in the hand grip 12 for movement in a pump bore 44 at a right angle to the axis A—A of the barrel 13. A main piston 18 is slidable in a bore 19 formed in the barrel and concentric with the axis A—A.

The forward end of the barrel portion 13 has a threaded opening 20 into which is threaded a tubular adapter 21. Piston 18 has a forwardly-extending piston rod 22 which extends through opening 20 and the bore of the adapter 21 and has a threaded end 23. A shear member, generally indicated at 24, has a rearwardly-extending threaded bore 25 which is threaded onto end 23 of piston 22. Shear member 24 is slidable within the bore 26 of a tubular portion 27 of a shear member generally indicated by the reference numeral 28. Shear members 28 and 24 are hereinafter referred to as first and second shear members, respectively. The tubular portion 27 of first shear member 28 fits over the adapter 21 and is fixed to the adapter by means of a retainer clip 29 which snapes into aligned grooves 30 and 31 in tubular portion 27 and adapter 21, respectively. Tubular portion 27, bore 25, piston rod 22, and adapter 21 are all concentric around the axis A—A. The first and second shear members 28 and 24, respectively, are shown specifically in FIGS. 4–7 and will be described in greater detail hereinafter.

Bore 19 carries a reservoir of hydraulic fluid. A check valve 32 is located in a passage 33 connecting the pump bore 44 to the main bore 19. The check valve 32 is arranged to allow hydraulic fluid flow only from the pump bore 44 to the main bore 19. Another check valve 37 is connected to allow flow of fluid only from the rearward portion of bore 19 to the pump bore 44. A manually-operated valve 38 is mounted to selectively connect the main bore 19 on the forward side of the main piston 18 to the rear end of bore 19. As is evident in FIGS. 1, 2, and 3, the valve 38 is operated by a movable member 39 mounted externally of the main body in such a position that it can be pressed by the operator's thumb when his hand is wrapped around the hand-grip 12. Check valve 32 allows fluid flow only from the pump bore 44 to the main bore 19 at forward side of the main piston 18, to left as viewed in FIG. 3. Check valve 37 allows the fluid to flow in bore 19 only from the rearward side of the piston 18, at the right as viewed in FIG. 3, to the forward side of the piston 18. Manually-operated valve 38 allows fluid to flow back from the forward side of the piston 18 to the rearward side thereof when it is desired to do so. The squeeze lever 14 is connected to the pump piston 17 by a lever system 45. The squeezing of the lever 14 toward the hand-grip 12 causes a point in the lever system to move the pump piston vertically upwardly within bore 44. The squeeze lever is provided with a protuberance 46 on the side facing the hand grip. This protuberance has a pivot pin 47 which moves parallel to the axis of the pump bore 44 when the squeeze lever is moved toward the handle-grip. One end of a first link 48 is pivotally connected to the squeeze lever 14 by the pivot pin 47 and one end of a second link 49 is pivotally connected to the handle-grip 12 by a pivot pin 42. The other ends of the two lengths 48 and 49 are pivotally connected by a pin 43. The first length 48 is provided with an integral bell crank arm 51 that extends beyond the pivotal connection 43 of the links and engages the pump piston 17. A coil spring 52 concentric with the pump piston is operative to bias the pump piston in the bell crank arm 51 in the direction that moves the squeeze lever away from the hand-grip. A large slotted bolt 54 is provided to allow the operator to bleed the system as this seems to be necessary. A large coil spring 53 in bore 19 normally urges the main piston 18 towards a forward end of the bore, as shown in FIG. 3.

Squeezing of lever 14 toward the hand-grip 12 and to the lever system 45, causes piston 17 to move upwardly in the bore 44 causing hydraulic fluid to flow through the check valve 27 to the left-hand or forward side of the main piston 18. This moves piston 18 a small distance to the right as viewed in FIG. 3. Upon completion of a stroke of the piston, the operator allows the squeeze lever 14 to move back away from the handle-grip 12. The coil spring 52 carries the piston back down again. When it does this, suction is created in the bore 44 above the piston 17 and this closes the ball valve 27, while at the same time causing the ball valve 37 to open against pressure of its spring. This allows hydraulic fluid to travel from the right side of the bore 19 to the check valve 37 into the bore 44. Hydraulic fluid is, therefore, available for the next stroke of the piston 17. Repeated squeezing of the lever 14 toward the handle grip 12 causes the piston 18 to move progressively from the forward end of the bore to the rearward end thereof, from left to right as viewed in FIG. 3. This provides the motive power for the piston rod 22 and the second shear member 24 to which it is attached.

Referring to FIGS. 1, 2, 3, 6, and 7, the first shear member 28 is fixed to the barrel portion of the housing 11 by means of a tubular portion 27 in a manner previously described. First shear member 28 has a first extending portion 56 which extends forwardly out to the portion 27 and contains a slot 58 generally transverse to the axis A—A, (see particularly FIGS. 6 and 7). One side of the slot 58 has a forwardly facing surface 60 which extends generally transversely of the axis A—A and intersects a flat surface 62 extending along axis A—A. A first cutting edge 64 is formed at the corner where surfaces 60 and 62 intersect. Surface 60 extends from axis A—A at a slight angle so that it forms an acute angle with flat surface 62. Surface 60 also extends at a slight angle from the vertical so that first cutting edge 64 leans forwardly, as shown in FIG. 7.

Referring particularly to FIGS. 1–4, the second shear member 24 has a forwardly-extending portion 66 which includes a flat surface 68 extending along axis A—A and a slot 70 extending generally transverse to the axis A—A and intersecting flat surface 68. The forward wall of slot 70 has a surface 72 which forms which surface 68 a second cutting edge 74 along a generally vertical line where surfaces 72 and 68 intersect. Surface 72 extends at a slight angle with respect to surface 74, as shown in FIGS. 2 and 4. Surface 72 also extends at a slight angle from the vertical so that second cutting edge 74 leans slightly rearwardly, as shown in FIG. 5.

When the first and second shear members 24 and 28 are assembled in the body of the hydraulic gun 10, as shown in FIGS. 1, 2, and 3, their respective flat surface 62 and 68 abut along axis A—A and define a shear plane therebetween, the flat surfaces and shear plane being generally transverse to the slots 58 and 70. When the piston 18 is in the forward position shown in FIG. 3, the slots 68 and 70 of the first and second shear members 28 and 24, respectively, are aligned as shown in FIGS. 1 and 2. In this position, the first and second cutting edges 60 and 72, respectively, are spaced along axis A—A to define the open position of the shearing tool, wherein a workpiece to be cut is inserted in the grooves between the first and second cutting edges. As shown in FIG. 6, one portion of the groove 30 extends through the wall of the tubular portion 27 as indicated by reference numeral 30'. When the first shear member 28 is properly positioned on adapter 21 so that grooves 30 and 31 are aligned, a portion of the retaining clip 21 extends into the groove 31 from the cut-through portion 30' in groove 30 to lock the first shear member 28 onto adapter 21.

The operation of and advantages of the present invention will now be readily understood in view of the above description. A workpiece to be cut, such as a strand of wire indicated at W, is inserted in the grooves 58 and 70 in the open position, as shown in FIG. 8. In this open position, piston 18 is in the forward postion, to the left, in bore 19 as shown in FIG. 3 and cutting edges 74 and 64 are spaced from each other within the shear plane along axis A—A. The operator then presses the squeeze lever 14 toward the grip-handle 12 to cause the piston 18 to move to the rear of the bore 19, to the right as shown in FIG. 3, in a manner previously described to draw piston 22 within the gun housing and consequently draw second shear member 24 towards the housing relative to first shear member 28 as shown in FIG. 9. As cutting edge 74 approaches cutting edge 64 along axis A—A within the shear plane, the work W is sheared from both sides as shown in FIG. 9. Repeated strokes of the lever 14 finally causes second shear member 24 to be drawn toward the housing sufficiently to enable the workpiece W to be completely severed at the point where cutting edges 64 and 74 pass each other along axis A—A as shown in FIG. 10. The grooves 58 and 70 enable the workpeice to be held in positon before cutting and also help to retain the workpiece as it is being cut. At least one groove is needed for this purpose, preferably groove 70 in second shear member 24. Since the surfaces 60 and 72 extend at a slight angle to a transverse plane to the shear plane, as shown in the figures, these surfaces form acute angles where they intersect respective flat surfaces 62 and 68. This assures that the cutting edges 64 and 74 will engage the workpiece before their respective surfaces 72 and 60 to prevent the workpiece from being twisted before any cutting takes place. The fact that the cutting edges 58, 74 coverge from the bottom of their respective grooves insures that the workpiece will be held in the grooves. Initial cutting of the workpiece begins above the center of the workpiece and tends to force the workpiece down into the bottom of the groove. This is particularly useful for cutting multi-strand non-coated wire.

The shearing tool thus described, represents a handy, easy to use implement which will reliably cut most substances generally considered difficult to shear such as cable, heavy wire, etc. The design of the cutting elements is such that as much power may be applied to the cutting elements as is necessary for cutting difficult to cut workpieces. In addition, the tool may be used in a wide number of environments, including industry, repair shops, the home, etc. The tool may also be used in tight places where conventional tools are hard to manuever, particularly for electrical wiring where the tool may be easily inserted within the outlet boxes or similar confined locations. The movable release member 39 is also easily accesible to operate valve 38 or returning piston 18 to the forward position shown in FIG. 3, and thereby quickly returning the movable or second shear member 24 from the closed cutting position shown in FIG. 10 back to the open position shown in FIG. 8.

The hydraulic gun shown in FIG. 3 represents a simplified version of several hydraulic designs which could be employed with the shearing tool. A more sophisticated hydraulic gun is shown in my U.S. Pat. No. 4,086,802 issued May 2, 1978 entitled "RIVET GUN". The gun disclosed in this patent is used as a riveting tool but it has been adapted to function as a shearing tool. However, the gun is operated in the same manner disclosed in the present application, except that it is provided with a hydraulic pressure release system to prevent excessive pressures from developing and a reserve reservoir of hydraulic fluid for maintaining the supply of fluid at a desired level. These details have not been shown in the present application for the sake of simplicity.

Referring to FIG. 11, there is shown a modified fixed shear member generally indicated by the reference numeral 28', indentical to shear member 28 except that the first extending portion, indicated at 56', terminates at the forwardly facing surface 60'. The slot 58 of the first shear member 28 is thereby eliminated in modified shear member 28'. In addition, forwardly facing surface 60' and the cutting edge 64' formed at the intersection of surface 60' and flat surface 62' extend to the bottom of the extending portion 56' at the same angle as surface 60 and cutting edge 64 in shear member 28. The advantage of this modification is the cutting edge 64' may be more easily sharpened by the user.

It is obvious that minor changes may be made in the form and construction of the invention without departing from the material spirit thereof. It is not, however, desired to confine the invention to the exact form shown and described but it is desired to include all such as properly come within the scope claimed.

The invention having been thus described, what is claimed as new and desired to secure by Letters Patent is:

1. A shearing tool, comprising:
(a) a housing
(b) a first shear member having a tubular portion fixed to the housing and an extending portion provided with a first cutting edge spaced from the tubular portion and located within a shear plane,
(c) a second shear member slidably mounted within the tubular portion of the first shear member and having an extending portion provided with a flat surface within said shear plane and a slot extending generally transverse to said shear plane and intersecting said flat surface to form a second cutting edge within said shear plane, said second shear member being movable along a straight axis within said shear plane from an open position at which the second cutting edge is spaced from and opposes the first cutting edge to a closed shearing position at which the first cutting edge meets the second cutting edge, said slot being always spaced from said tubular portion, and (d) actuating means for moving the second shear member between the said open and closed position.

2. A shearing tool as recited in claim 1, wherein the shear plane bisects the tubular portion of the first shear member.

3. A shearing tool as recited in claim 1, wherein the extending portion of the first shear member is provided with a flat surface within the shear plane in sliding contact with the flat surface of the second shear member.

4. A shearing tool as recited in claim 1, wherein the second cutting edge faces toward the housing and the second cutting edge faces away from the housing.

5. A shearing tool as recited in claim 1, wherein the first cutting edge extends at an angle with respect to the second cutting edge within the shear plane, so that the first and second cutting edges diverge toward the bottom of the slot.

6. A shearing tool as recited in claim 1, wherein the first shear member is provided with a flat surface within said shear plane and a slot that extends generally transverse to said shear plane, so that the first cutting edge is formed where the flat surface and one side defining the slot of the first shear member intersect.

* * * * *